(12) United States Patent
Viala

(10) Patent No.: US 12,424,361 B2
(45) Date of Patent: Sep. 23, 2025

(54) ELECTROMAGNETIC MATERIAL AND INDUCTANCE FOR LOW TEMPERATURES

(71) Applicant: Commissariat à l'Énergie Atomique et aux Énergies Alternatives, Paris (FR)

(72) Inventor: Bernard Viala, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 821 days.

(21) Appl. No.: 17/543,693

(22) Filed: Dec. 6, 2021

(65) Prior Publication Data

US 2022/0181053 A1    Jun. 9, 2022

(30) Foreign Application Priority Data

Dec. 8, 2020    (FR) ...................... 2012856

(51) Int. Cl.
| | | |
|---|---|---|
| *H01F 1/28* | (2006.01) | |
| *C04B 35/52* | (2006.01) | |
| *C08K 3/14* | (2006.01) | |
| *C08K 3/28* | (2006.01) | |
| *H01F 1/00* | (2006.01) | |

(52) U.S. Cl.
CPC .............. *H01F 1/28* (2013.01); *C04B 35/52* (2013.01); *C08K 3/14* (2013.01); *C08K 3/28* (2013.01); *H01F 1/0018* (2013.01); *H01F 1/0054* (2013.01); *H01F 1/0063* (2013.01); *C04B 2235/3817* (2013.01); *C04B 2235/3852* (2013.01); *C04B 2235/405* (2013.01); *C04B 2235/422* (2013.01); *C04B 2235/5454* (2013.01); *C04B 2235/781* (2013.01); *C08K 2201/01* (2013.01); *C08K 2201/011* (2013.01)

(58) Field of Classification Search
CPC .......... C08K 2201/01; C08K 2201/011; C04B 2235/3817; C04B 2235/3852; C04B 2235/405; C04B 2235/781; H01F 1/28; H01F 1/0063; H01F 1/0054; H01F 1/0018; H01F 38/00; H01F 27/24
See application file for complete search history.

(56) References Cited

U.S. PATENT DOCUMENTS

| | | | | |
|---|---|---|---|---|
| 4,824,587 | A * | 4/1989 | Kwon ....................... | H01F 1/44 252/62.53 |
| 5,574,961 | A * | 11/1996 | Edelstein ............... | G11B 5/657 428/548 |
| 2006/0283290 | A1* | 12/2006 | Hattori ................... | H01F 1/065 148/306 |
| 2012/0012778 | A1 | 1/2012 | Tilley et al. | |
| 2012/0229238 | A1 | 9/2012 | Hirota et al. | |
| 2013/0342069 | A1 | 12/2013 | Rowe | |

FOREIGN PATENT DOCUMENTS

FR    2 953 028 A1    5/2011

OTHER PUBLICATIONS

Preliminary Search Report for French Application No. 2012856, dated Aug. 25, 2021.

* cited by examiner

*Primary Examiner* — C Melissa Koslow
(74) *Attorney, Agent, or Firm* — Wolf, Greenfield & Sacks, P.C.

(57) ABSTRACT

An electromagnetic material for an inductance for operation at cryogenic temperatures including, in an electrically insulating matrix, metal nanoparticles with superparamagnetic behavior of size less than or equal to 30 nm and having a magnetic permeability greater than or equal to 1.5 for a frequency between 5 GHz and 50 GHz.

16 Claims, 3 Drawing Sheets

ELECTROMAGNETIC MATERIAL AND INDUCTANCE FOR LOW TEMPERATURES

CROSS-REFERENCE TO RELATED APPLICATION

This application claims priority to French application number 2012856, filed Dec. 8, 2020, the contents of which is incorporated by reference in its entirety.

TECHNICAL FIELD

The present disclosure relates generally to inductances and more specifically to inductances for quantum computers. More particularly, the present disclosure relates to an electromagnetic material for the manufacturing of inductances operating at low temperatures for quantum devices.

BACKGROUND ART

In quantum computers, the inductances as well as all the electronic components located around the core of the quantum computer are brought to a very low temperature (at as close as possible to 0 K) in order to limit the thermal disturbances coming from these components. The known inductances that are closest to the specifications related to the working frequencies of quantum computers are, to date, the inductances developed for applications related to 5G telecommunications. The inductances currently used in 5G technology are made of thin layers on silicon using current microelectronic means. They are made of a multitude of thin layers of dielectric materials (metal oxides and nitrides, polymers . . . ), conductors (Al, Cu, Au, Ni) and magnetic (amorphous or nanocrystalline films based on Fe, Co, Ni). All these layers are deposited on a substrate (Si, SOI, glass, ceramic etc.). These inductances are designed to operate at temperatures between −40° C. and +85° C. and can withstand manufacturing temperatures up to 400° C. However, if the operating temperature approaches 0 K, as in the case of quantum applications, the component will experience very high compressive forces (since it was expanded at the time of manufacture), generally causing layer de-cohesion, broken electrical connections and even substrate fracturing.

In more emerging hybrid technologies, there is a trend to reduce the number of high heat balance thin films and replace them with functional polymers that settle at room temperature. For example, the magnetic multilayer material can be replaced by a thick polymer containing ferromagnetic particles that also acts as an electrical insulator with the inductance turns and encapsulating resin. The mechanical and electrical reliability in the face of thermal variations, especially negative ones, is improved. In addition, the polymers are very resistant to very low temperatures.

However, to obtain high operating frequencies (5 to 10 GHz), it is necessary to use submicron ferromagnetic particles, for example smaller than 100 nm, to limit losses beyond 1 GHz.

The handling of these ferromagnetic particles is extremely delicate because they retain a remanent magnetism at room temperature. They therefore act as very small "magnets" that attract each other head to tail and stick together. In practice, this type of nanoparticle agglomerates spontaneously and it is particularly difficult to separate them. This forms conductive aggregates within the polymer which generate excess losses from 1 GHz which is not desirable.

SUMMARY OF INVENTION

There is a need for improved inductances for quantum computers.

One embodiment addresses all or some of the drawbacks of known quantum computer inductances.

One embodiment more particularly provides for an electromagnetic material suitable for manufacturing inductances.

One embodiment provides an electromagnetic material for an inductance operating at cryogenic temperatures comprising, in an electrically insulating matrix, metal nanoparticles with superparamagnetic behavior of a size less than or equal to 30 nm and having a magnetic permeability greater than or equal to 1.5 for a frequency between 5 GHz and 50 GHz.

According to one embodiment, each particle is inscribed in a cube or parallelepiped of size less than or equal to 20 nm.

According to one embodiment, each particle is inscribed in a cube or parallelepiped of size less than or equal to 10 nm.

According to one embodiment, the magnetic permeability of each particle is greater than 3.

According to one embodiment, the matrix is a polymer.

According to one embodiment, the matrix is a metal oxide.

According to one embodiment, the matrix is a graphene oxide.

According to one embodiment, the particles comprise iron, cobalt, nickel, and/or an alloy of these metals.

According to one embodiment, the particles are iron carbides or nitrides such as $Fe_3C$, $Fe_5C_2$, $Fe_2N$, $Fe_4N$, $Fe_{16}N_2$.

According to one embodiment, the particles are covered with a protective surface layer of inorganic or organic material such as graphene, graphite, amorphous carbon, a metal oxide or a polymer.

One embodiment provides an inductive element including an electromagnetic material, as described above, characterized in that the inductance value is higher (e.g., by 10%, 30%, 50%, 100%, 200%) at a temperature less than or equal to 4 K than at room temperature.

According to one embodiment, the inductive element operates at a temperature less than or equal to 4K.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the coil turns, their shape, size and material have not been detailed, as the electromagnetic material described hereinafter is compatible with the usual coils.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, as orientated during normal use.

Unless specified otherwise, the expressions "around", "approximately", "substantially" and "in the order of" signify within 10%, and preferably within 5%.

Figure 1:
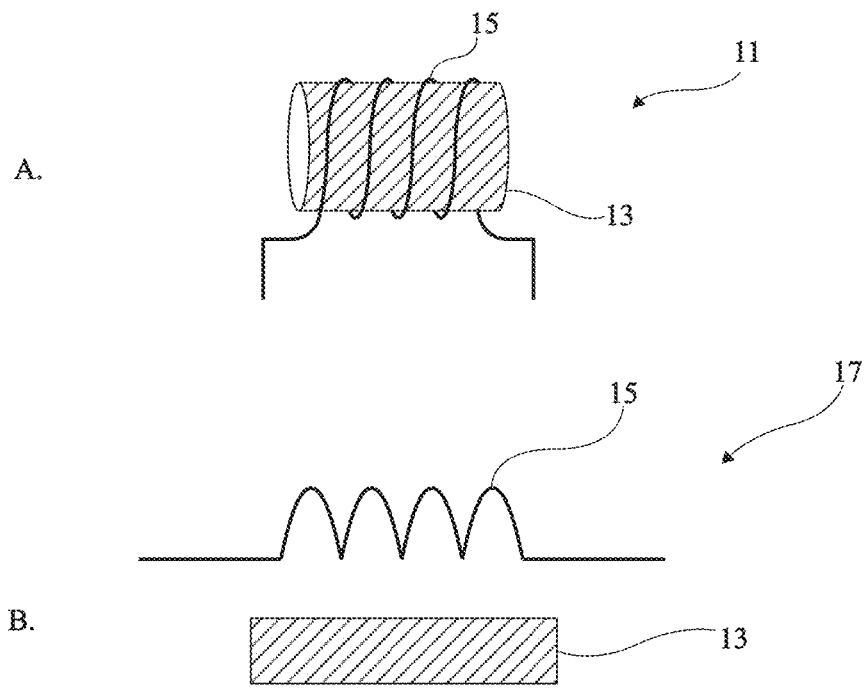
FIG. 1 represents schematically by views A and B, two embodiments of an inductance.

FIG. 1 shows schematically in views A and B, two embodiments of an inductance.

In particular, FIG. 1 illustrates in view A the schematic of an inductance 11 in which a magnetic material 13 is located in the turns of a coil 15 and in view B the schematic of an inductance 17 in which the magnetic material is located below (or above) a planar winding 15 (typically in the form of a spiral).

Inductances are electronic compounds having the ability to store magnetic energy when a current is passed through them. Inductances are used in many electronic fields and in particular in quantum calculators, also called quantum computers.

As previously mentioned, in quantum computers, the inductances as well as all the electronic components located around the core of the quantum computer are brought to a very low temperature (close to 0 K at the most), for example to 4 K, in order to limit the thermal disturbances coming from these components. While usual inductances are adapted to undergo expansion, they are not, on the other hand, able to resist such low temperatures.

Figure 2:
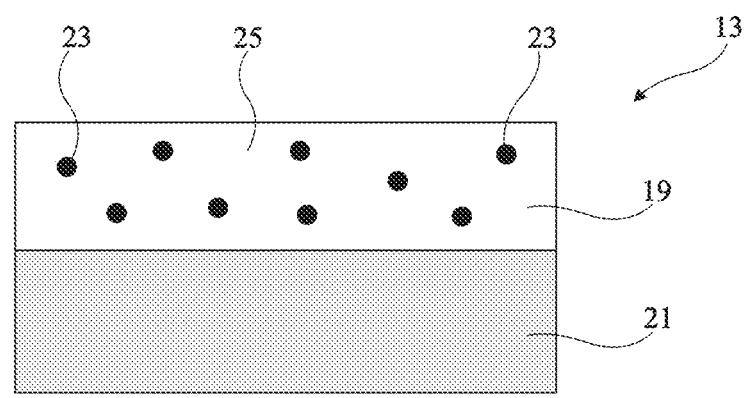
FIG. 2 represents a cross-sectional view of a magnetic material of the inductance illustrated in view B of FIG. 1.

FIG. 2 shows a cross-sectional view of the magnetic material 13 of the inductance 17 shown in view B of FIG. 1.

More particularly, the magnetic material 13 comprises an assembly of electromagnetic material 19 and a substrate 21.

The substrate 21 is preferably a substrate of a semiconductor material, for example, silicon. Preferably, substrate 21 is a silicon wafer. The substrate 21 presents, for example, a thickness between 200 μm and 800 μm.

The electromagnetic material 19 comprises magnetic metal particles 23 in an electrically insulating matrix 25.

The magnetic metal particles 23 may be spherical, hexagonal, cubic, cylindrical, or have any shape. Each magnetic metal particle 23 fits into a cube or parallelepiped of which the smallest side is less than or equal to about 30 nm, i.e., the size is less than or equal to about 30 nm. Preferably, each magnetic metal particle 23 fits into a cube or parallelepiped the smallest side of which is less than or equal to about 20 nm, i.e., the size of which is less than or equal to about 20 nm. More preferably, each magnetic metal particle 23 fits into a cube or parallelepiped the smallest side of which is less than or equal to about 10 nm, that is, the size of which is less than or equal to about 10 nm. As an example, the characteristic size of a magnetic metal particle 23 is the diameter of the magnetic metal particle 23 if the magnetic metal particle 23 is spherical or the size of one side of the magnetic metal particle 23 if the magnetic metal particle 23 is cubic.

The magnetic metal particles 23 present superparamagnetic behavior, i.e., their magnetization can spontaneously reverse under the influence of temperature. Thus, it can be said by simplification of language that the magnetic metal particles 23 are not magnetized at room temperature (i.e., about 25° C. or 298 K) but become magnetized at very low temperatures, typically below 4 K.

The magnetic metal particles 23 may be made of a material having a magnetic permeability greater than 1.5 for frequencies between 5 GHz and 50 GHz. The magnetic metal particles 23 are preferably made of a material having a magnetic permeability greater than 2 and more preferably greater than 3 for frequencies between 5 GHz and 50 GHz.

The magnetic metal particles 23 are preferably made of iron (Fe), cobalt (Co) and/or nickel (Ni). The particles 23 are, for example, made of a material selected from iron (Fe), cobalt (Co), nickel (Ni), and alloys thereof, iron carbides ($Fe_3C$ or $Fe_5C_2$) or an iron nitride ($Fe_2N$, $Fe_4N$ or $Fe_{16}N_2$).

As an example, iron-cobalt alloy (FeCo) particles are superparamagnetic at room temperature if each of them can fit into a cube with a side size of 23 nm or less. According to another example, the iron particles are superparamagnetic at room temperature if each of them can fit into a cube with a side less than or equal to 16 nm. According to yet another example, the cobalt particles are superparamagnetic at room temperature if each of them can fit into a cube with a side length less than or equal to 8 nm.

The particles 23 may be covered with a protective film or protective shell to protect them from oxidation. As an example, the shell can be made of carbon (of the graphene, graphite or amorphous type) and/or metal oxide (silica or alumina).

The insulating matrix 25 is preferably composed of a material selected from a polymer, graphene oxide, or a metal oxide. The insulating matrix 25 is, for example, polystyrene (PS) or epoxy.

Figure 3:
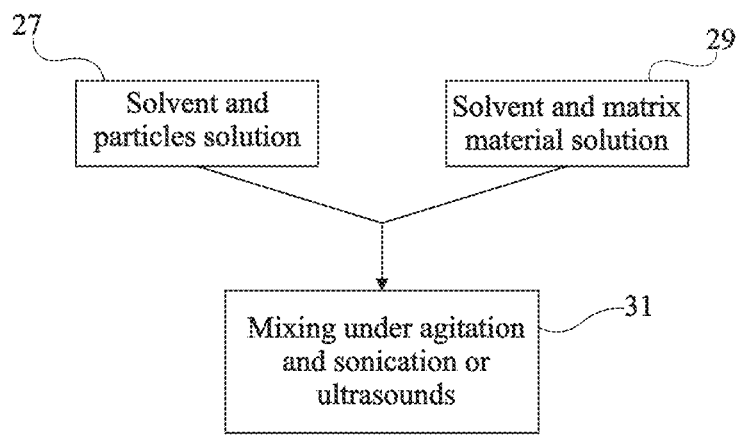
FIG. 3 represents a block diagram of a method for implementing a solution.
Figure 4:
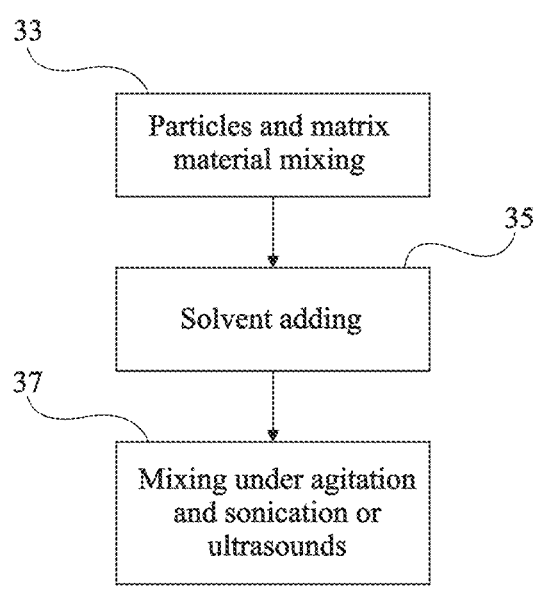
FIG. 4 represents a block diagram of another method for implementing the solution.
Figure 5:
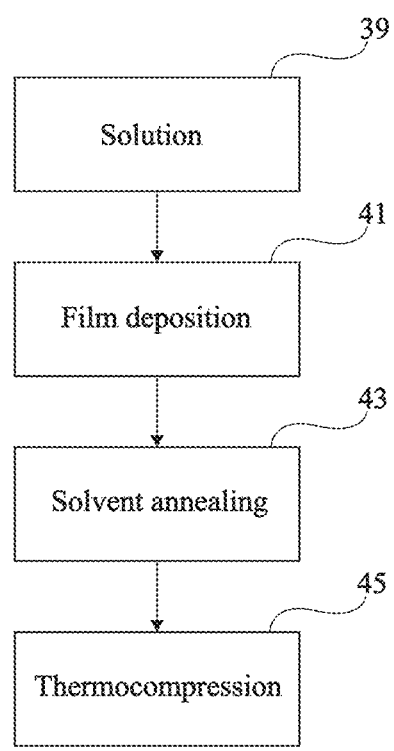
FIG. 5 represents a block diagram of a method for implementing the material shown in FIG. 2.

One implementation of the material 13 is described in relation to FIG. 5 from a solution made by either of the methods described in relation to FIGS. 3 and 4.

FIG. 3 represents a block diagram of a method for implementing a solution.

More particularly, FIG. 3 illustrates the method for implementing a solution comprising the magnetic metal particles 23 and the insulating matrix 25 in solution.

The magnetic metal particles 23 are, in a first step 27, dispersed in a first solvent (Solvent and particles solution). In this step, the dispersion of the magnetic metal particles 23 in the solvent can be assisted by mechanical agitation. The dispersion of the magnetic metal particles 23 is further assisted by sonication, ultrasonication or ultrasound.

An advantage that appears is that the dispersion of the magnetic metal particles 23 is facilitated by the fact that, at room temperature, the latter are not magnetized. The particles 23 then aggregate little and can be better separated with less sonication power and time (i.e., power between 0.5 W and 50 W versus 500 W to break up aggregates of magnetic particles). When the power and sonication time is high (a few hundred Watts for several tens of minutes), the particles 23 can be damaged.

During step 27, a dielectric polymer is optionally grafted to the surface of the magnetic nanoparticles 23. This grafting, for example, assisted by sonication, ensures electrical insulation between the particles. The dielectric polymer, for example, is grafted in the form of a very thin layer, of the order of a few nanometers, for example of a thickness equal to about 4 nm.

In parallel with step 27, the insulating matrix is dissolved in a second solvent during a step 29 (Solvent and matrix material solution). Alternatively, step 29 may be performed before or after step 27.

The first solvent may be different or identical to the second solvent, however, the first solvent and the second solvent are miscible.

In step 29, the dissolution of the insulating matrix 25 in the second solvent may be assisted by mechanical agitation and, optionally, by ultrasound.

In a step 31 subsequent to steps 27 and 29, the solution comprising the magnetic metal particles 23 and the solution comprising the insulating matrix 25 are mixed (Mixing under agitation and sonication or ultrasounds), preferably under mechanical agitation and sonication or ultrasounds.

Alternatively, the insulating matrix 25 is not dissolved in step 29 and is added directly in step 31.

FIG. 4 represents by a block diagram another method for implementing the solution.

FIG. 4 illustrates a method similar to the method illustrated in FIG. 3 except that the magnetic metal particles 23 are mixed with the insulating matrix 25 in a step 33 (Particles and matrix material mixing) before adding a solvent to the mixture in a step 35 (Solvent adding). Similar to the method illustrated in FIG. 3, the dispersion of the particles 23 in the solvent and the dissolution of the matrix 25 in this same solvent are assisted by sonication and/or ultrasound (step 37, Mixing under agitation and sonication or ultrasounds).

Thus, while one would not tend to use these nanoparticles with superparamagnetic behavior to make inductive elements because of their lack of efficiency (i.e., having no contribution to inductance) at room temperature which is usually the behavior evaluated, it is intended here to take advantage of their change in behavior between room temperature and temperatures close to zero Kelvin in order to benefit from the other characteristics of these nanoparticles when they are at room temperature or higher, and in particular the ease given to keep them in suspension at room temperature, and to disperse them homogeneously, i.e. without aggregates.

FIG. 5 represents a block diagram of a method for processing the material illustrated in FIG. 2.

More particularly, FIG. 5 illustrates a method for processing the material illustrated in FIG. 2 from the solution produced in FIG. 3 or 4.

The solution is, in a first step 39, prepared according to one of the processing methods described in relation to FIGS. 3 and 4 (Solution). Following step 39, the solution is deposited, in a step 41, on the surface of the substrate (21, FIG. 2). In step 41, a wet film is formed (Film deposition). According to one embodiment, step 41 is performed by spin-coating or puddle-coating.

According to another embodiment, step 41 is carried out by ink jet, by spray deposition or by injection molding.

Following step 41, the structure composed of the film and the substrate (21, FIG. 2) is annealed (Solvent annealing) in a step 43 so as to evaporate the traces of solvent present in the film and to form the material 19. Preferably, the annealing is performed at a temperature of about 100° C. for about 10 minutes.

Step 43 may be followed by a thermal compression (thermocompression) step 45 to densify the material 19 and flatten it.

An advantage of the described embodiments and methods of implementation is that they avoid the usual spontaneous agglomeration of magnetic submicron particles.

Another advantage of the described embodiments and methods of implementation is that they provide an electromagnetic material in which the magnetic metal particles have a homogeneous dispersion in the insulating matrix.

Yet another advantage of the described embodiments and methods of implementation is that they make it possible to simplify the step of dispersing the particles in the insulating matrix or in the solvent and thus preserve the surface condition of the particles.

Yet another advantage of the described embodiments and methods of implementation is that they make it possible to provide the electromagnetic material with better electrical insulation and to reduce electromagnetic losses compared to the materials usually used in inductances.

Various embodiments and variants have been described. Those skilled in the art will understand that certain features of these embodiments can be combined, and other variants will readily occur to those skilled in the art.

Finally, the practical implementation of the embodiments and variants described herein is within the capabilities of those skilled in the art based on the functional description provided hereinabove.

The invention claimed is:

1. An inductive element comprising an electromagnetic material for an inductance operating at cryogenic temperatures comprising, in an electrically insulating matrix, metal or iron carbides or iron nitrides nanoparticles with superparamagnetic behavior of size less than or equal to 30 nm and having a magnetic permeability greater than or equal to 1.5 for a frequency between 5 GHz and 50 GHz, wherein the inductance value is higher at a temperature less than or equal to 4 K than at room temperature.

2. The inductive element according to claim 1, wherein each nanoparticle has a size less than or equal to 20 nm.

3. The inductive elemental according to claim 1, wherein each nanoparticle has a size less than or equal to 10 nm.

4. The inductive element according to claim 1, wherein the magnetic permeability of each nanoparticle is greater than 3.

5. The inductive element according to claim 1, wherein the matrix is a polymer.

6. The inductive element according to claim 1, wherein the matrix is a metal oxide.

7. The inductive element according to claim 1, wherein the matrix is a graphene oxide.

8. The inductive element according to claim 1, wherein the nanoparticles comprise iron, cobalt, nickel, and/or an alloy of these metals.

9. The inductive element according to claim 1, wherein the nanoparticles are iron carbides or nitrides of the group consisting of $Fe_3C$, $Fe_5C_2$, $Fe_2N$, $Fe_4N$, and $Fe_{16}N_2$.

10. The inductive element according to claim 1, wherein the nanoparticles are covered with a protective surface layer of inorganic or organic material.

11. The inductive element according to claim 10, wherein the protective surface layer is made of a material of the group consisting of graphene, graphite, amorphous carbon, metal oxide, and polymer.

12. The inductive element according to claim 1, wherein the inductance value is higher by 30% at a temperature less than or equal to 4K than at room temperature.

13. The inductive element according to claim 1, wherein the inductance value is higher by 50% at a temperature less than or equal to 4K than at room temperature.

14. The inductive element according to claim 1, wherein the inductance value is higher by 100% at a temperature less than or equal to 4K than at room temperature.

15. The inductive element according to claim 1, wherein the inductance value is higher by 200% at a temperature less than or equal to 4K than at room temperature.

16. An electromagnetic material for an inductance operating at cryogenic temperatures comprising, in an electrically insulating matrix, metal or iron carbides or iron nitrides nanoparticles with superparamagnetic behavior of size less than or equal to 30 nm and having a magnetic permeability greater than or equal to 1.5 for a frequency between 5 GHz and 50 GHz, wherein the matrix is a graphene oxide.

* * * * *